Aug. 12, 1924.
C. S. WESTFALL ET AL
1,504,798
NEUTRAL SAFETY PEDAL ATTACHMENT
Filed Feb. 7, 1921
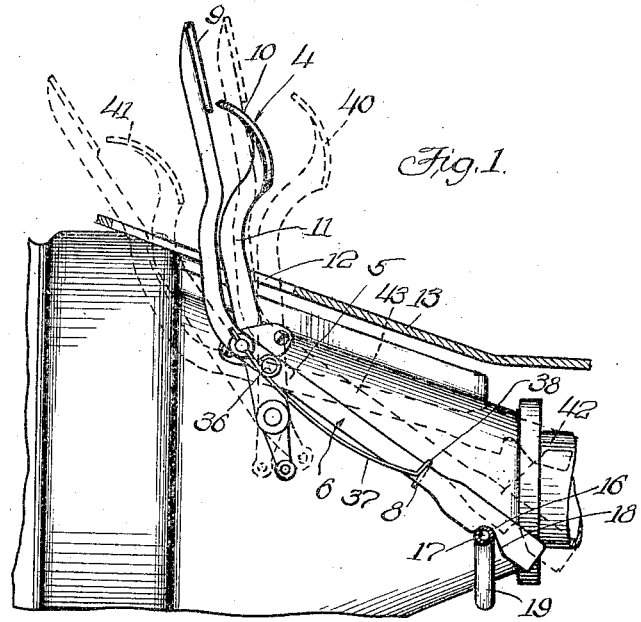
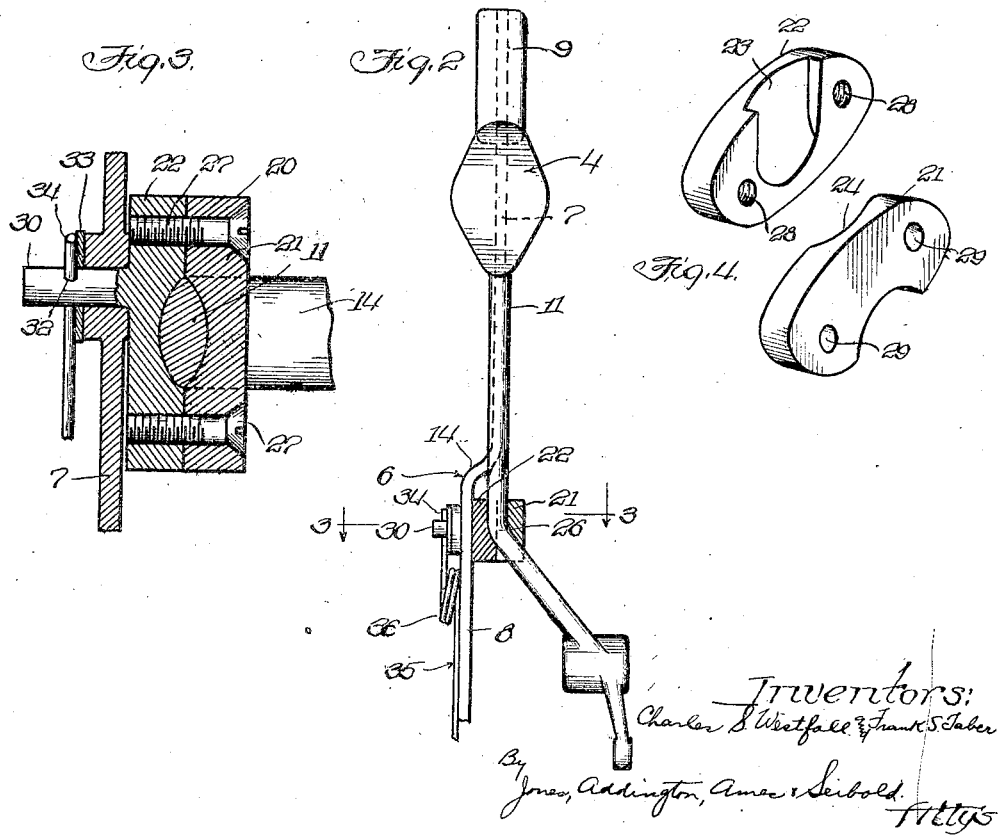
Inventors:
Charles S. Westfall & Frank S. Taber
By Jones, Addington, Ames & Seibold
Attys Patented Aug. 12, 1924.

1,504,798

UNITED STATES PATENT OFFICE.

CHARLES S. WESTFALL AND FRANK S. TABER, OF CHICAGO, ILLINOIS.

NEUTRAL SAFETY PEDAL ATTACHMENT.

Application filed February 7, 1921. Serial No. 442,931.

*To all whom it may concern:*

Be it known that we, CHARLES S. WESTFALL and FRANK S. TABER, both citizens of the United States, and both residing at Chicago, in the county of Cook and State of Illinois, have invented certain new and useful Improvements in Neutral Safety Pedal Attachments, of which the following is a full, clear, concise, and exact description, reference being had to the accompanying drawings, forming a part of this specification.

This invention relates to a neutral safety pedal attachment, and more particularly to an improved attachment of this character which can be secured to the clutch pedal of a Ford motor car and which insures the restraining of the clutch pedal in the neutral position whenever the clutch pedal passes through said neutral position in its travel from high to low speed, or vice versa.

Motor cars which are equipped with planetary transmissions, such as the Ford car, are ordinarily so designed that when the clutch pedal is pushed in a forward direction, the transmission of the car will be in first or low speed, and when the clutch pedal is allowed to be drawn backwardly, under the influence of a spring, the clutch pedal will be in the high or second speed. Intermediate between the high and low speed positions of the clutch pedal is the neutral position of the clutch pedal. If the operator of the car desires to move the clutch pedal into neutral position, this must be done manually by foot-power, and the exact neutral position in such an operation can only be approximated, inasmuch as the operator must estimate by his foot pressure when the pedal has reached the neutral position. Obviously, under these circumstances, the clutch pedal very seldom is positioned in the exact neutral position when the operator is attempting to hold the pedal in such position by foot power. Such a condition will result in excessive wear of the transmission bands on the planetary transmission and in other unsatisfactory and inefficient results. Similarly, when it is desired to throw a transmission of this kind into reverse, the operator must hold his foot on the clutch lever maintaining it in neutral position while he is operating the lever controlling the reverse propulsion mechanism.

It is one of the objects of this invention, therefore, to produce an improved attachment for the clutch pedal of a motor car which will automatically restrain said pedal in the exact neutral position whenever the said pedal passes through said neutral position.

Another object of this invention resides in the production of an attachment of this character which comprises a self-contained device and which can be attached to the clutch pedal without making any alterations in the car mechanism or other additions to the car equipment.

A further object resides in the production of means for securing the attachment to the clutch pedal whereby the said attachment will be self adjusting to the proper position to insure the locking of the clutch pedal in the true neutral position.

Another object of the invention resides in the production of an attachment of this character which is all located either in front of the clutch pedal or below the floor-board of the motor car.

An additional object resides in the production of an attachment of this kind which is exceedingly simple in construction; can be cheaply manufactured, and which can be quickly and easily installed on the car without the aid of a mechanic.

Other objects of the invention will be apparent from the following description; the accompanying drawings, and the appended claims.

For the purposes of description, a specific embodiment of this invention is illustrated in the accompanying drawings in which:—

Fig. 1 is a side elevation of the clutch pedal of a motor vehicle and shows the improved neutral safety attachment secured thereto, together with the transmission case and floor-board of the motor car;

Fig. 2 is a plan view of the clutch pedal with the attachment secured thereto;

Fig. 3 illustrates a view in cross section of the attachment clamping means on the plane indicated by the line 3—3 of Fig. 2 looking in the direction of the arrows; and, Fig. 4 is an illustration in perspective of the clamping device.

Referring particularly to Figs. 1 and 2, 4 represents the clutch pedal of the motor vehicle, and 5 the neutral safety pedal attachment. The attachment 5 is fitted with the lever-arm 6, which consists of the upwardly and forwardly extending parts 7 and the rearwardly extending portion 8. Integral with the part 7 at its foremost end is the foot-plate 9, the lower end of which rests and is normally held against the foot-plate 10 of the clutch pedal 4. The forwardly extending arm 7 is positioned directly beneath the arm 11 of the clutch pedal and passes through the slot 12 in the floor-board 13, provided for the arm 11 of the clutch pedal. This slot 12 in the ordinary construction of the motor vehicle is elongated to permit the movement of the clutch pedal from low to high speed and the arm 7 of the lever-arm 6 is so positioned in back of the arm 11 of the pedal 4, so that it will likewise readily operate in this slot 12 without any alterations. The arm 7, after passing through the floor-board, is bent to one side as indicated at 14, so that the rearwardly extending portion 8 of the lever-arm 6 will be positioned to one side of the arm of the clutch pedal 4. The rearwardly extending portion 8 of the lever-arm 6 is provided with a notch 16 (See Fig. 1), said notch being cut at right angles to the side face of the arm at its forward end 17 and being provided with a gradual slope 18 at its rearward end. This notch is so designed that its forward face 17 will rest on the controller shaft 19 of the motor vehicle when the clutch pedal 4 is in its true neutral position.

A controller shaft, such as 19, is provided with all Ford motor vehicles and carries the emergency brake as well as an arm equipped with a cam which moves the transmission into its neutral position when the emergency brake is drawn to the neutral position. The emergency brake in the Ford motor vehicles provides the only means whereby the transmission can be moved to the neutral position and held and restrained in such position without a continued physical effort of the operator. Furthermore, when thus moving the brake to the neutral position, the operator must estimate the exact and true position of the brake for such neutral position. This estimation of the true neutral position is entirely eliminaated by the neutral safety pedal attachment made in accordance with the teachings of this invention, and the neutral position is attained by a restraining of the clutch pedal whenever the clutch pedal moves through that portion of the arc from high to low or low to high speed, which is represented by the true neutral position of the transmission.

The lever-arm 6 is secured to the clutch pedal 4 by means of a clamping device, as clearly illustrated in Figs. 3 and 4. This clamping device 20 consists of two parts, 21 and 22. Each of these parts is slotted. the part 22 being equipped with the slot 23 and the part 21 with the slot 24. These slots 23 and 24 cooperate when the parts 21 and 22 are equipped to form a passageway for the arm of the clutch pedal, which passageway fits over and confines the bent portions 26, with which all clutch pedals furnished with Ford motor cars are equipped. The two parts are securely clamped in position over this bend 26 in the clutch pedal by means of screws, such as 27. These screws 27 are secured in the threaded aperture such as 28, provided in the parts 22 and are fitted through the unthreaded apertures 29 in the part 21.

When the clamping device 20 is positioned over the bend 26 in the clutch pedal 4, as clearly indicated in Fig. 2, and the screws 27 tightly secured in position, the clamping device 20 is rigidly held in position and cannot be displaced. The rigid positioning of the clamping device 20 is insured because of the bend in the clutch pedal 4, over which the clamping device 20 is placed, and by virtue of which cooperation the clamping device 20 cannot be moved in either direction. This clamping device, as well as the bend in the clutch pedal, and the offset portion and rearwardly extending part of the lever-arm 6, are all positioned below the floor-board of the motor vehicle, as clearly illustrated in Fig. 1.

Secured to and preferably integral with the part 22 of the clamping device is the pivot pin 30. The lever-arm 6 is perforated at 31, and this perforation fits over the pivot pin 30, as clearly illustrated in Fig. 3. The pin 30 is perforated at 32, this perforation being so positioned that when the lever-arm 6 and a washer 33 have been placed in position on the pin 30, as illustrated in Fig. 3, the perforation 32 is located so that it will just clear the outside face of the washer 33. The perforation 32 is adapted to receive one end 34 of a spring 35. This spring is equipped with a spiral portion 36, which spiral portion may consist of any desired number of convolutions, preferably two. Extending rearwardly from the spiral portion 36 is a straight portion of the spring 37 which is fitted at its rear end with a hook 38, which rests over and is hooked onto the rearwardly extending portion 8 of the lever-arm 6.

The spring 35, therefore, functions to hold the lever-arm 6 in position on the pin 30 of the part 22 of the clamping device 20. It also serves to tend to turn the lever-arm is a clockwise direction, whereby the rear portion 8 of the lever-arm, when not displaced, will be forceably held against the controller shaft 19 when the clutch pedal is in the neutral position or in a position slightly displaced either way from said neutral position. The spring 35, because of its design and construction, also serves to exert a pressure against the washer 33, thereby holding the washer tightly against the lever-arm 6, which will prevent any rattling of the parts comprising the neutral safety pedal attachment.

It will now be evident that the neutral safety pedal attachment, as hereinbefore described, is a self-contained device comprising the lever-arm 6 and the clamping device 20, the lever-arm being secured to the clamping device by means of the pin 30 and the spring 35.

It will also be apparent that the clamping device 20, because of its peculiar location on the bent portion of the clutch pedal of the motor vehicle, can only be positioned in one position, and that consequently, when the clamping device 20 is secured to the pedal 4, it will be self-adjusting because of the cooperative action of the grooves in the clamping device and the bend in the pedal. Since the clamping device is self-adjusting and the position of the lever-arm 6 on the clamping device is positively determined by means of the pin 30, the position of the notch 16 in the rearwardly extending portion 8 of the lever-arm 6, with respect to the controller shaft 19, will be definitely determined when the attachment is clamped to the clutch pedal 4.

The attachment, therefore, is self-adjusting, since it can be secured to the pedal in but one position, in which position the lever-arm 6 is so positioned, with respect to the clutch pedal 4 and the controller shaft 19, that said clutch pedal 4 will be automatically arrested or restrained in the neutral position whenever the said pedal passes through said neutral position in its path from high to low or low to high speed.

From an inspection of Figs. 1 and 2, it will be noted that the forwardly extending portion of the lever-arm 6 is positioned in back of the arm 11 of the clutch pedal 4, and consequently this portion of the lever-arm is out of the way and does not interfere with the regular operation of the motor vehicle. Further, the remaining portion of the neutral safety pedal attachment, which is not positioned in back of the arm 11 of the clutch pedal 4, is positioned under the floorboard 13, and is thus likewise so disposed that it will not interfere with the normal and regular operation of the motor vehicle.

The attachment consequently comprises a unitary device which can be quickly secured to the clutch pedal by one unskilled in mechanics. No changes or alterations in any portion of the motor vehicle are necessary, the only actual operation required to secure the attachment to the motor vehicle in its proper and accurate functioning position consisting in the placing of the clamping means 20 about the bend 26 in the clutch pedal 4 and the tightening of the screws 27.

In the normal operation of a clutch pedal 4, for an ordinary planetary transmission, it is commonly held in the rear or high position as indicated in broken lines at 40 in Fig. 1. The clutch pedal 4 is moved from its high position, as shown at 40, to its first or low speed position, as shown in broken lines at 41, by the foot pressure of the operator of the motor vehicle. As the clutch pedal 4 moves from the position 40 to the position 41, the lever-arm 6 of the neutral safety pedal attachment will slide from the broken line position, shown at 42, to the full line position in which the notch 16 will ride on the controller shaft 19. If the foot pressure is removed from the clutch pedal, when it reaches the full line position, the clutch pedal will not return to the high speed broken line position, shown at 40, since it will be automatically restrained or arrested in the full line position by the cooperative action of the face 17 of the notch 16 against the controller shaft 19. However, if the operator desires to move the clutch pedal to the low speed position this can be readily accomplished by continuing the foot pressure, which will carry the clutch pedal to the broken line position shown at 41, the lever-arm 6 in this instance assuming the dotted line position shown at 43.

When the operator desires to change from low to high speed, he removes the foot pressure from the clutch pedal 4, positioned as shown in the dotted lines at 41, whereupon, the clutch pedal will move toward the high speed position shown at 40. In this movement, however, the lever-arm 6 will slide back to the full line position indicated in Fig. 1, and would be permanently arrested in this position, unless the operator of the motor vehicle exerts a slight foot pressure on the foot-plate 9 of the lever-arm 6. The pressure thus exerted on this foot plate 9 will cause the lever-arm 6 to swing about its pivotal point on the pin 30, thereby raising the face 17 of the notch 16 above the controller shaft 19, which, in turn, permits the clutch pedal to continue to its high speed position indicated in dotted lines at 40, the lever-arm 6 riding over the top of the controller shaft 19 to its high speed position as indicated at broken lines at 42.

In the normal operation of the clutch pedal 4, fitted with a neutral safety pedal attachment constructed in accordance with the teachings of this invention, it will, therefore, follow that the clutch pedal 4 will be automatically restrained in the neutral position whenever it passes in its movement from its high speed position to its low speed position, or vice versa.

The use of such an attachment is, therefore, of great value in the driving of motor vehicles equipped with planetary transmissions, such as for example motor vehicles of the Ford manufacture, since it provides means whereby the operator of the vehicle can coast free of the transmission without holding his foot on the clutch pedal. The operator is similarly in a position to operate his reverse lever for reverse operation of the motor vehicle without manually holding the clutch pedal in the neutral position and without operating the emergency brake for the purpose of throwing the transmission to the neutral position. In other words, the attachment comprises an improved and simplified means which can be attached to the motor vehicle without any alterations in the motor vehicle itself, whereby the operator is relieved of performing manually the operation of holding the clutch pedal in the neutral position, this operation being automatically performed by the attachment whenever the operator moves the clutch pedal to the neutral position.

Obviously, the invention is not limited to the specific embodiment thereof herein illustrated and described, but is capable of many modifications and alterations within its spirit and scope, as set forth in the following claims.

Having thus described my invention, what I claim as new and desire to secure by Letters Patent is:

1. In a device of the character described, the combination with a clutch pedal, of a unitary attachment secured to said clutch pedal at a point underneath the floor-board of the motor vehicle, the said attachment having an operating portion extending upwardly behind said clutch pedal and through the standard clutch pedal slot of the floor board, and having means below the floor board to automatically restrain the pedal in neutral position whenever it moves through said position.

2. In a device of the character described, the combination with a clutch pedal, of a unitary attachment clamped to said clutch pedal, the said attachment having an operating portion extending upwardly behind said clutch pedal and through the standard clutch pedal slot of the floor-board, and also having a notched portion extending underneath the floor-board for engagement at predetermined times with a standard fixed part of the motor vehicle.

3. In a device of the character described, the combination with a clutch pedal, of a unitary attachment secured to said clutch pedal comprising a pedal clamping means whereby the pedal is automatically restrained in the neutral position whenever it moves through said position, and means provided with said clamping means to automatically position said attachment in the correct position with respect to said pedal at a point underneath the floor-board of the vehicle.

4. In a device of the character described, the combination with a clutch pedal, of a unitary attachment secured to said clutch pedal comprising a pedal clamping means whereby the pedal will be automatically restrained in the neutral position whenever it moves through said position, cooperating grooves provided in said clamping means, said grooves cooperating with said pedal to automatically position the attachment in the correct position with respect to said pedal.

5. In a device of the character described, the combination with a clutch pedal, of a pedal restraining device secured to said pedal comprising a pivotal bar consisting of a forward portion extending up through the vehicle floor-board and in back of said pedal, and a rear portion extending rearwardly under said floor-board, a clamping device adapted to receive said bar and automatically position it in operative position on said pedal, and a resilient means cooperating with said clamping device and bar to automatically restrain said pedal in the neutral position whenever it moves through said neutral position.

6. In a device of the character described, the combination with a clutch pedal, of a pivotal bar consisting of a forward portion extending up through the vehicle floor-board and in back of said pedal, and a rear portion extending rearwardly under said floor-board, a clamping device adapted to receive said bar and automatically position it in operative position on said pedal, cooperating grooves in said clamping device cooperating with a bend in said pedal to automatically position it in operating position on said pedal, and a resilient means cooperating with said clamping device and bar to automatically restrain said pedal in the neutral position whenever it moves through said position.

7. The combination with a neutral safety clutch pedal attachment, of a clamping means comprising two parts, grooves positioned in one face of each of said parts, said grooves cooperating with a securing means to automatically and positively position said attachment in a bend in said pedal, thereby positively positioning said attachment in its true operative position.

8. The combination with a neutral safety clutch pedal attachment provided with a restraining arm, of a clamping means comprising two parts, grooves positioned on one face of each of said parts, a mounting pin extending from the other face of one of said parts, said pin serving as the pivot for the restraining arm of said attachment, said grooves cooperating with a securing means to automatically and positively position said attachment in a bend in said pedal, thereby positioning said attachment in its true operative position.

9. The combination with a neutral safety clutch pedal attachment provided with a restraining arm, of a clamping means comprising two parts, grooves positioned in one face of each of said parts, said grooves cooperating with a securing means to automatically and positively position said attachment in a bend of said pedal, thereby positively positioning said attachment in its true operative position, a spring cooperating with said clamping means and said arm, the said spring serving to retain said arm on said clamping means and to hold said arm in its restraining position.

10. In a device of the character described, the combination with a clutch pedal, of a unitary attachment secured to said clutch pedal comprising a pedal clamping means and a spring actuated mechanism, said spring actuated mechanism and clamping means being secured to said pedal underneath the floor-board of the vehicle, and a foot actuating portion of said attachment extending through said floor-board substantially behind the arm of said clutch pedal, said spring actuated mechanism automatically restraining said clutch pedal in its neutral position whenever it moves through said position.

In witness whereof, we have hereunto subscribed our names.

CHARLES S. WESTFALL.
FRANK S. TABER.